US005641229A

United States Patent [19]
McClintock et al.

[11] Patent Number: 5,641,229
[45] Date of Patent: Jun. 24, 1997

[54] SAMPLE ROTATOR WITH MANUALLY ENERGIZED SPRING MOTOR

[75] Inventors: Joseph A. McClintock; Gregory K. Shipman, both of Baltimore, Md.

[73] Assignee: Universal Healthwatch, Inc., Columbia, Md.

[21] Appl. No.: 577,621

[22] Filed: Dec. 22, 1995

[51] Int. Cl.⁶ .................. B01F 11/00; F03G 1/06
[52] U.S. Cl. .................. 366/208; 185/39; 185/44
[58] Field of Search .................. 366/110, 111, 366/113, 114, 208–211, 213–216, 219; 185/37, 39, 44

[56] References Cited

U.S. PATENT DOCUMENTS

| | | | |
|---|---|---|---|
| 312,169 | 2/1885 | Schmidt | 185/39 |
| 407,942 | 7/1889 | Newcomb | 185/39 |
| 468,982 | 2/1892 | Moore | 185/39 |
| 916,523 | 3/1909 | Armstrong | 185/39 |
| 936,668 | 10/1909 | Roberti | 185/39 |
| 1,130,637 | 3/1915 | Schatte | 185/39 |
| 1,231,078 | 6/1917 | Feldhaus . | |
| 1,280,305 | 10/1918 | Roig | 185/44 |
| 1,571,031 | 1/1926 | Weil | 185/44 |
| 2,007,361 | 7/1935 | Berger . | |
| 3,589,464 | 6/1971 | Katchamakoff . | |
| 4,118,801 | 10/1978 | Kraft et al. . | |
| 4,147,516 | 4/1979 | deBruyne . | |
| 4,202,634 | 5/1980 | Kraft et al. | 366/208 X |
| 4,371,058 | 2/1983 | Holley . | |
| 4,676,122 | 6/1987 | Szabo et al. . | |
| 4,747,693 | 5/1988 | Kahl . | |
| 4,750,845 | 6/1988 | Nabetani | 366/209 X |
| 5,013,446 | 5/1991 | Li et al. . | |
| 5,052,812 | 10/1991 | Tannenbaum et al. | 366/209 |
| 5,084,242 | 1/1992 | Sakuma et al. . | |
| 5,143,627 | 9/1992 | Lapidus et al. . | |
| 5,240,606 | 8/1993 | Lapidus et al. . | |
| 5,271,673 | 12/1993 | Bohnet et al. . | |
| 5,332,310 | 7/1994 | Wells | 366/347 X |
| 5,511,879 | 4/1996 | Fletcher | 366/208 |

FOREIGN PATENT DOCUMENTS

| | | | |
|---|---|---|---|
| 151889 | 10/1920 | United Kingdom | 185/44 |
| 1199840 | 7/1970 | United Kingdom | 366/209 |

OTHER PUBLICATIONS

Nicholas P. Chironis, Mechanisms & Mechanical Devices Sourcebook, McGraw–Hill, Inc., 1991, pp. 176–177.

*Primary Examiner*—Charles E. Cooley
*Attorney, Agent, or Firm*—Foley & Lardner

[57] ABSTRACT

A manual sample rotator and method provides a mechanical orbital motion, which is useful in medical industries. The rotator has a substantially rectangular orbiting member with four guiding wells, complementary to four guiding posts provided on a fixed member, such as a housing. Each guiding post is inserted into one of the guiding wells. The guiding wells are larger than the counterpart guiding posts so that when the guiding posts are seated into the wells, the clearance therebetween allows the orbiting member to move in the horizontal plane in all directions within the bounds of the guiding wells. The guiding post and well arrangement thus restrains the orbiting member from rotating about the orbital axis, but permits the member to orbit thereabout. The orbiting member is orbited around a main orbital axis using an offset crank (output shaft end), which rotates about the main orbital axis and is rotatable about an axis offset from the main axis relative to the orbiting member. A manually operated spring motor rotates the orbiting member. The spring motor also has a time indicator, a level indicator, and a level adjuster.

8 Claims, 2 Drawing Sheets

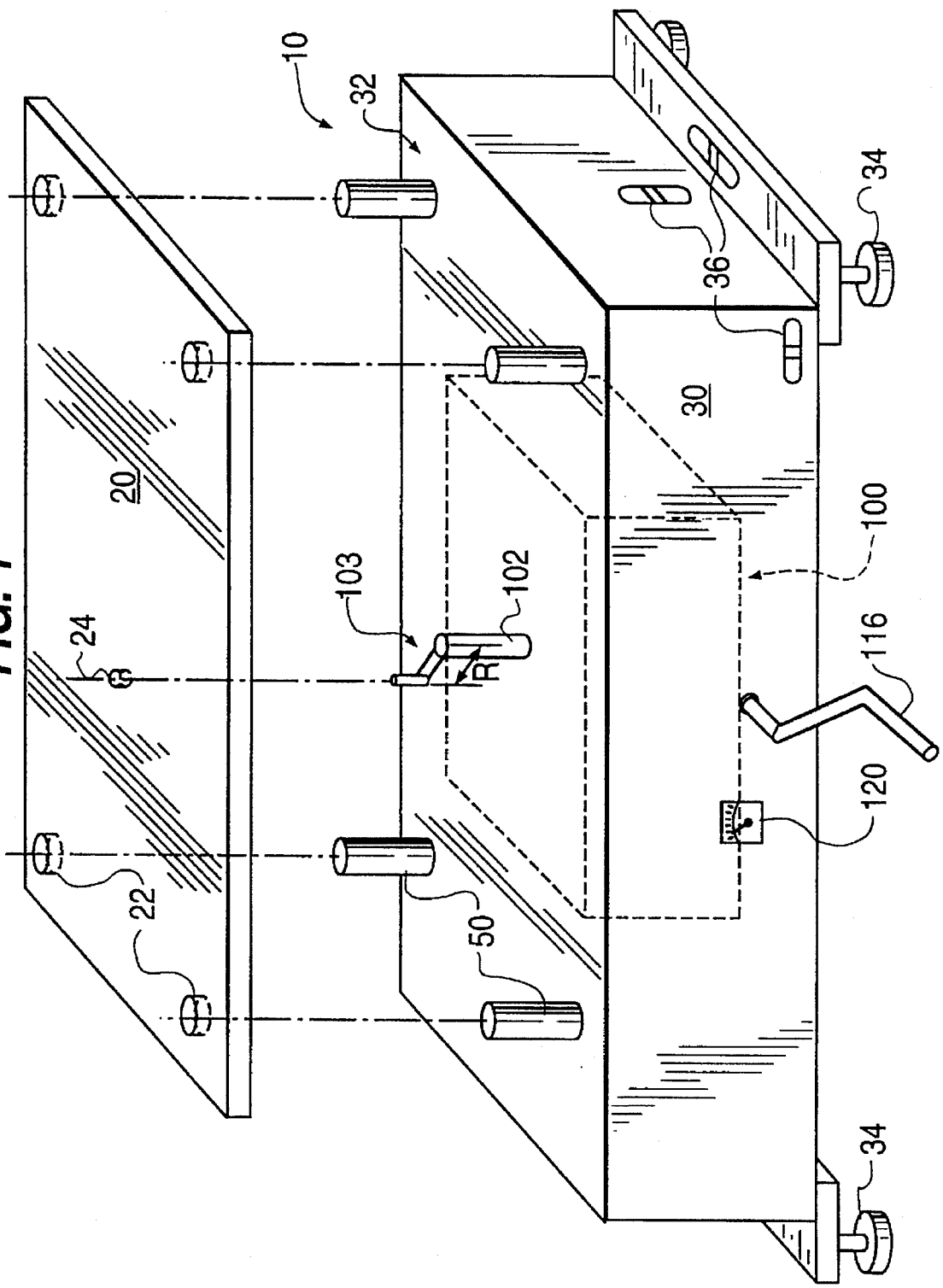

SAMPLE ROTATOR WITH MANUALLY ENERGIZED SPRING MOTOR

BACKGROUND

Early response to infectious diseases is key to stamping out or controlling them. This means that a widespread population must be screened to identify the carriers and the associated diseases. Particularly in the rural third world nations with a poorly developed infrastructure, where there is little or no public health systems, it is necessary to respond to epidemics with rapid field testing and treatment. But many tests that can fulfill this need are expensive and require laboratories with complex equipments, ones that require power (electricity). In many rural areas, power is not available, and if it is, it is scarce. So it is desirable to use devices that do not use electricity in these circumstances.

Fortunately, there are inexpensive and rapid testing procedures for identifying diseases, namely, ones that involve co-agglutination reactions, which make them excellent candidates for population screening. To succeed with a co-agglutination testing, the sample must be mixed with reagent chemicals for periods up to 10 minutes. A conventional electrical rotating or mixing equipment, such as the ones described in U.S. Pat. Nos. 4,118,801 and 4,747,693, could do the job but for the power requirement. For example, a conventional orbiting commercially available rotator, such as a Fisher Clinical Rotator (Scientific Model 341), provides an orbiting motion driven by a timer-actuated electrical motor that can be used with a co-agglutination testing.

These conventional mixers are useless without power. Another drawback is that different countries use a different power system and a rotator made for one system may not be compatible with another system. It is particularly difficult to conduct a field testing when there is no electric power available. If it is necessary to collect samples and return to a test site having power, the screening will be unduly delayed, and people will go without treatment.

Thus, there is a need for a sample rotator that can be used universally under all circumstances, particularly for field uses, to benefit from readily available on site tests, such as co-agglutination tests.

The present invention fulfills this need.

SUMMARY

The present rotator and method provides a mechanical orbital motion, which is useful in medical industries. The rotator comprises an orbiting member, a housing having guides for guiding the orbiting member, an eccentric driver, and a manually energized spring motor. The orbiting member is adapted to seat or hold one or more samples. The guides guide the orbiting member so that it moves in an orbital path. Specifically, the orbiting member is substantially rectangular has four guiding wells complementary to four guiding posts extending from a rotator base or housing. Each guiding post is inserted into one of the guiding wells. The guiding wells are larger than the counterpart guiding posts so that when the guiding posts are seated into the wells, the clearance therebetween allows the orbiting member to move in the horizontal plane in all directions within the bounds of the guiding wells. The guiding post/well arrangement thus restrains the orbiting member from rotating about the orbital axis, but permitting it to orbit thereabout. At least the guiding posts and wells each preferably include a friction reducing material, such as TEFLON, to reduce friction between the moving surfaces and maximize efficiency.

The eccentric driver or offset crank, which rotates about the main orbital axis and is rotatable about an axis offset from the main axis relative to the orbiting member, is rotatingly connected to the orbiting member. The manually energized spring motor rotates the eccentric driver about the main axis to drive the orbiting member.

Specifically, the spring motor has a coil spring, preferably a type having a constant torque. A driving shaft is rotatably journaled about the housing containing the spring motor. One end of the coil spring is connected to the driving shaft and another end connected to the housing or a fixed member within the housing. The motor has a transmission coupling the driving shaft to an output shaft, which is coupled to or forms the eccentric driver. The transmission rotates the output shaft at a higher speed than the driving shaft. The motor also has a manual crank coupled to the driving shaft for energizing the spring. In this regard, an input shaft journaled for rotation about the housing is coupled between the crank and the driving shaft so that crank and the input shaft always rotate with the driving shaft. Thus, manually rotating the crank rotates the input shaft and the driving shaft to energize the spring.

A time indicator is coupled to the input shaft. Rotating the input shaft in the spring winding direction moves the indicator in one direction and rotating the input shaft in the opposite direction moves the indicator in the opposite direction.

The rotator further includes a level indicator connected to the housing. In this regard, it also can include means for adjusting the level of housing relative to a support where the rotator rests.

According the present method, a sample or specimen is placed or rested on a member that can be moved about in all directions in a horizontal plane. The member is restricted to a predetermined amount of movement in the horizontal plane. Then, the member is orbited about a vertical axis. The restriction prevents the member from rotating about the vertical axis, but permits the member to only orbit around it instead.

The rotating step involves coupling a driving shaft journaled for rotation about a fixed member to one end of a coil spring and another end of the spring to the fixed member. A transmission is coupled between the output shaft and the driving shaft. This output shaft drives the eccentric driver, which is rotatably coupled to the member. Manually winding the driving shaft using a manual crank energizes and stores energy in the spring. Upon releasing the crank after a desired amount has been wound, the spring rotates the driving shaft and rotates the output shaft at a higher speed than the driving shaft to impart an orbital motion to the member.

BRIEF DESCRIPTION OF THE DRAWINGS

These and other features, aspects, and advantages of the present invention will become much more apparent from the following description, appended claims, and accompanying drawings where:

FIG. 1 shows an exploded view of a sample rotator according to the present invention.

DESCRIPTION OF THE DRAWINGS

Figure 1A:
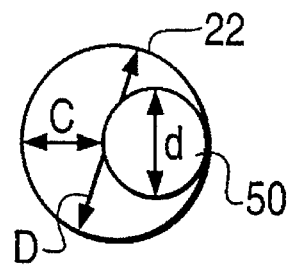
FIG. 1A shows a partial view of the guiding well/post configuration.

The sample rotator 10 according to the present invention comprises an orbiting member 20 connected to a manually operated rotary spring motor 100. In the embodiment shown, the rotating device 100 is contained within a housing 30. An upper wall 32 of the housing supports four cylindrical guide posts 50. The orbiting member 20 has a corresponding number of guide wells 22 each having a predetermined depth at its four corners. The orbiting member 20 thus stably rests on the four corners of the guide posts. As more clearly shown in FIG. 1A, the guide wells 22 each are preferably cylindrical, but has a larger diameter to permit the orbiting member to move about a horizontal plane by a predetermined clearance C (D-d=2 cm for a 1 cm orbit), which determines, along with the well shape, the orbit shape. The spring motor has an output shaft 102 that rotates about a main orbital axis, which shaft has an offset end 103 that orbits about the main axis. The distance R between the main axis and the off-set axis determines the radius of the orbit. This distance R is preferably 1 cm. The guiding posts 50 and wells 22 constrain the orbiting member 20 to move in an orbit, while preventing a planetary motion (rotation about the main axis as it orbits). The aforementioned Fisher Scientific Model 341 rotator also has this type of arrangement, but uses an electrically driven motor.

With electrically driven devices, friction is not that critical as a typical servo mechanism incorporated therein provides a precise rotating speed control. With the manual type, on the other hand, it would be desirable to minimize frictional and any mechanical energy loss to harness a maximum amount of the input energy. In this regard, the present invention contemplates incorporating a friction reducer at least between the guiding posts 50 and wells 22. Specifically, the guiding posts, at least the portion contacting the guide wells are each coated with TEFLON or the like. The posts themselves can also be made of a friction reducing material. The wells each also have a coating of TEFLON. Alternatively, the orbiting member can be drilled to form the wells 22 with TEFLON inserts placed therein. Similarly, the guide posts 50 can have TEFLON socks or the like at least over the free ends making contact with the wells. TEFLON to TEFLON sliding surfaces even further reduce friction. Additional lubricants can be used between TEFLON surfaces to further reduce friction.

The orbiting member at its center (gravity or mass) has an opening 24 that receives the offset end 103. The opening preferably is slightly larger than the end diameter to prevent binding. The opening 24 and the end 103 each also preferably include a TEFLON coating or respectively, a TEFLON insert and a sock to further reduce friction. It should be noted that the shaft end 103 rotates relative to the orbiting member 20 (which cannot rotate about its center because it is restrained by the guiding wells and posts).

The housing also includes four leveling feet 34 threaded into the lower portion of the housing to level the rotator. In this regard, conventional leveling indicators 36, such as leveling bubbles, are preferably placed on the housing as shown in FIG. 1.

Spring motors have long been in use—for example, wind-up clocks, phonographs, motion picture cameras, etc. See pp. 176–177 in MECHANISMS & MECHANICAL DEVICES SOURCEBOOK by Nicholas P. Chironis, published by McGraw-Hill, Inc., 1991, which describes some of the patented spring motor designs, the disclosure of which is incorporated herein by reference. Specifically, it is known in this art to use spring motors with gear trains, feed-back mechanisms, brakes, and governors or the like to regulate power and speed. The spring motors described in the aforementioned publication can be easily adapted to orbit the orbiting member 20.

Figure 2:
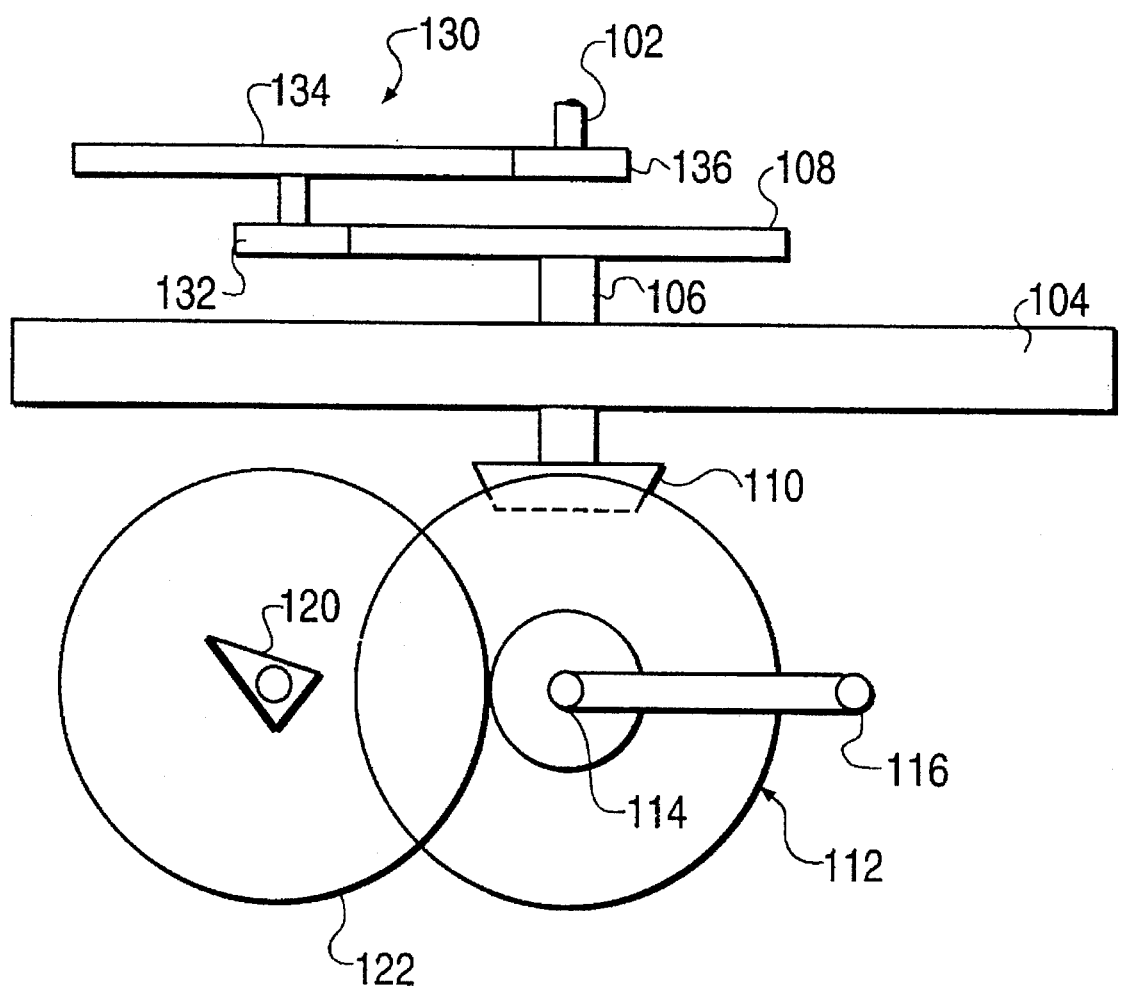
FIG. 2 shows a schematic view of the spring motor.

FIG. 2 shows a schematic diagram of the preferred spring motor 100 according to the present invention. The spring motor comprises a constant-torque producing flat-coil spring 104. One end of the spring 104 is connected to a fixed member such as the housing and the other end is connected to a rotatable drive shaft 106 rotatably journaled in the housing. The drive shaft 106 has two coaxially arranged gears, a driving spur gear 108 and a driven bevel gear 110.

The driven bevel gear 110 mates with an input bevel gear 112, which is coaxially arranged with an input shaft 114 journaled for rotation in the housing 30. The end opposite the input bevel gear 112 holding end of the input shaft 114 has a crank or key 116 extending through the housing 30 so that it is externally accessible. The crank or key can also be removably attached to the input shaft if desired. The input shaft 114 holds a timer gear 118 for driving a time-remaining indicator 120. Specifically, the timer gear 118 is coaxially attached to the input shaft and mated to a generally larger gear 122, which is journaled for rotation in the housing driving the indicator 120. The indicator, which is visible through the housing or is position outside the housing, thus corresponds to the energy input to the spring.

The driving gear 108 is connected to a step-up (speed increasing) transmission 130. Specifically the transmission 130 includes a driven spur gear 132 coaxially coupled to a larger driving spur gear 134, which finally mates with a smaller driven spur gear 136 to drive the output shaft 102.

The rotator operates as soon as the operator releases the crank (or is removed) after the spring is energized or wound. The spring rotates the driving shaft 106, which in turn rotates the output shaft 102 via the transmission 130 at a higher speed than the driving shaft 106, and rotates the input shaft 114 and the crank 116 (if attached) at a slower speed than the driving shaft 106. The input shaft rotates the time indicator 120. A simple band attached to the housing can be used to hold the crank in place to stop the operation. Alternatively, a stop pin can be moved in and out of the final driven gear 136 where the torque is at a minimum. These additional stopping members are simple to operate and repair and do not interfere with the operation of the spring motor even if they malfunction.

In the present embodiment shown, the spring energy drives both the orbiting member 20 and the time indicator 120. Instead of using a governor to regulate the speed, the present invention relies on the constant torque spring and the inertia of the orbiting member and gears. This not only simplifies the mechanism and reduces the component count, it will simplify field servicing. In this regard, it is desirable to include spare components, including the spring and tools inside the housing. In addition, the components such as gears can be made of plastics. Any metal component, however, preferably is coated with one or more corrosion resistant material, such as those widely used in boat and gun industries to combat salt corrosion.

It should be noted that based on the desired goal of achieving 100 rpm, with 1 cm orbit with a load of about 1 lbs (the orbiting member weight), and desired time of less than 10 minutes, an ordinary skilled artisan could easily calculate the necessary spring and the gearing. The orbiting-member mass preferably is much greater than the sample mass placed on it so that its mass is negligible compared to the orbiting-member mass. The orbiting-member mass, however, could be reduced as desired by using a light material such as a foam or foam composite.

In operation, the rotator 10, with the orbiting member 20 is placed on a convenient level surface if available. Using the level indicators 36 provided, the leveling feet 34 are adjusted, if needed by rotation, to level the rotator. Then the crank 116 is first attached to the input shaft 114 if it is removable. Otherwise the crank is rotated in the direction that would wind the spring 104, using the time indicator as a guide. When the user stops winding or the crank removed, after a desired amount of energy is stored, the orbital process begins. The sample can be place at any time on the orbiting member 20, either before cranking or just before releasing the crank, or even while the member 20 is orbiting.

Given the disclosure of the present invention, one versed in the art would appreciate that there may be other embodiments and modifications within the scope and spirit of the present invention. Accordingly, all expedient modifications attainable by one versed in the art from the present disclosure within the scope and spirit of the present invention are to be included as further embodiments of the present invention. The scope of the present invention accordingly is to be defined as set forth in the appended claims.

What is claimed is:

1. A portable rotator for providing a mechanical orbital motion for mixing or stirring a co-agglutination sample, comprising:

a housing having guides;

an orbiting member for seating the sample guided in the guides so that the orbiting member follows an orbital path;

an eccentric driver rotatingly connected to the orbiting member, wherein the eccentric driver rotates about a main orbital axis and is rotatable about an axis offset from the main axis relative to the orbiting member;

a manually energized spring motor for rotating the eccentric driver about the main axis, wherein the guides and the eccentric driver move the orbiting member about an orbit, wherein the spring motor comprises:

a coil spring, a driving shaft rotatably journaled about the housing, one end of the coil spring connected to the driving shaft and another end connected to a fixed member within the housing, an output shaft rotatable about the main axis and coupled to the eccentric driver, a transmission connected between the output shaft and the driving shaft to rotate the eccentric driver at a higher speed than the driving shaft, an input shaft journaled for rotation about the housing and coupled to the driving shaft so that the driving shaft rotates together with the input shaft, a crank attached to the input shaft to rotate the input shaft and thus the driving shaft to wind the spring, and a time indicator coupled to the input shaft, wherein rotation of the input shaft in the direction that energizes the spring moves the indicator in one direction and rotation of the input shaft in the opposite direction moves the indicator in the opposite direction.

2. A portable rotator according to claim 1, wherein the orbiting member is substantially rectangular and has four guiding wells cooperating with the guides.

3. A portable rotator according to claim 2, wherein the guides include four guiding posts, each inserted into one of the guiding wells, wherein the guiding posts and the guiding wells allow the orbiting member to move in the horizontal plane but is restrained from rotating about the main axis.

4. A portable rotator according to claim 3, wherein the guiding posts and wells each include a friction reducing material to reduce friction between the guiding posts and wells.

5. A portable rotator according to claim 1, wherein the crank attached to the input shaft always rotates with the input shaft and the driving shaft.

6. A portable rotator according to claim 5, further comprising a level indicator connected to the housing.

7. A portable rotator according to claim 6, further comprising means to adjust the level of housing relative to a support.

8. A method of providing a mechanical orbital motion for a co-agglutination sample comprising:

resting or placing a sample on a movable member on which the sample can be rested and moved about in a horizontal plane;

limiting the movement of the movable member by a predetermined amount in the horizontal plane;

orbiting the movable member about a vertical axis, wherein the limiting step prevents the movable member from rotating about the vertical axis and enabling an orbital motion, wherein the orbiting step comprises:

providing a driving shaft journaled for rotation about a fixed member and connecting one end of a coil spring to the driving shaft and another end of the spring to the fixed member;

coupling the driving shaft to a speed increasing transmission;

coupling an output of the transmission to an output shaft, wherein the output shaft has an offset end, which rotates about a main orbital axis and is rotatable relative to the movable member;

coupling the offset end to the movable member;

coupling an input shaft to the driving shaft so that the driving shaft rotates together with the input shaft;

attaching a crank to the input shaft to rotate the input shaft and thus the driving shaft to wind the spring;

coupling a time indicator to the input shaft, wherein rotation of the input shaft in the direction that energizes the spring moves the indicator in one direction and rotation of the input shaft in the opposite direction moves the indicator in the opposite direction;

manually winding the driving shaft with the crank to wind the spring and store energy therein and move the indicator in the one direction; and releasing the crank to release stored energy to rotate the driving shaft, which rotates the eccentric driver at a speed higher than the driving shaft, and imparting an orbital motion to the member and moving the indicator in the opposite direction.

* * * * *